United States Patent [19]

Isogai et al.

[11] 4,350,668

[45] Sep. 21, 1982

[54] RECOVERY OF COBALT COMPONENT FROM 3-PENTENOIC ESTER SYNTHESIS

[75] Inventors: Nobuo Isogai; Takashi Okawa; Motoyuki Hosokawa; Toshiyasu Watanabe; Natsuko Wakui, all of Niigata, Japan

[73] Assignee: Mitsubishi Gas Chemical Company, Inc., Tokyo, Japan

[21] Appl. No.: 246,065

[22] Filed: Mar. 20, 1981

[30] Foreign Application Priority Data

Mar. 24, 1980 [JP] Japan ................................ 55/37127

[51] Int. Cl.³ ...................... C01G 51/00; C07C 29/86; C07C 67/38
[52] U.S. Cl. .................................. 423/139; 423/150; 423/140; 560/206; 252/413
[58] Field of Search ............... 423/138, 139, 140, 150; 560/206; 252/413

[56] References Cited

U.S. PATENT DOCUMENTS

| 3,673,154 | 6/1972 | Trevillyan | 423/140 |
| 3,778,466 | 12/1973 | Matsuda | 560/206 |
| 3,956,175 | 5/1976 | Shigeyasu | 423/140 |
| 4,169,956 | 10/1979 | Kummer | 560/206 |
| 4,171,451 | 10/1979 | Kummer | 560/206 |

FOREIGN PATENT DOCUMENTS 49-34590  9/1974  Japan ................................. 252/413

Primary Examiner—Brian E. Hearn
Attorney, Agent, or Firm—Fleit & Jacobson

[57] ABSTRACT

In a process for producing a 3-pentenoic ester which comprises reacting butadiene, carbon monoxide and an alcohol in the presence of a solvent and a catalyst selected from cobalt carbonyl or cobalt carbonyl complex, the improvement which comprises distilling the reaction mixture to remove organic volatile components comprised of the 3-pentenoic ester and the unreacted raw materials and the solvent and contacting the distillation residue with an organic solvent to dissolve and/or disperse the residue in the solvent and contacting the resulting organic solution with an aqueous acid solution to extract any cobalt component from the organic solution with the aqueous acid solution, and separating the aqueous acid solution containing the cobalt component from the organic solution, and neutralizing the aqueous acid solution with an alkaline solution to precipitate a cobalt component is disclosed.

7 Claims, No Drawings

RECOVERY OF COBALT COMPONENT FROM 3-PENTENOIC ESTER SYNTHESIS

BACKGROUND OF THE INVENTION

This invention relates to recovery of the catalyst employed in a process for producing a 3-pentenoic ester which comprises reacting butadiene, carbon monoxide and an alcohol in the presence of a solvent and cobalt carbonyl or cobalt carbonyl complex catalysts.

Many processes for recovering the cobalt component from the reaction mixture obtained reacting butadiene, carbon monoxide and an alcohol have been proposed.

For example, two processes are disclosed in Japanese Patent Publication No. 7579/1975. In one (hereinafter called the extraction process) a cobalt component recovered from the reaction mixture obtained by reacting butadiene, carbon monoxide and an alcohol in the presence of a cobalt carbonyl catalyst or a cobalt carbonyl complex catalyst by extracting a 3-pentenoic ester from the reaction mixture which paraffins, such as cyclohexane or pretroleum ether and circulating the resulting cobalt carbonyl complex catalyst. In the other (hereinafter referred to as the distillation process), a cobalt component is recovered from the reaction mixture obtained by reacting butadiene, carbon monoxide and an alcohol in the presence of a cobalt carbonyl catalyst or a cobalt carbonyl complex catalyst by distilling a 3-pentenoic ester from the reaction mixture and circulating the resulting cobalt carbonyl complex.

However, though the ratio of recovery of the cobalt carbonyl catalyst is high in the first recovering procedure of the extraction process, the more the catalyst is used, the more easily it is transferred into the paraffin phase, so, with repeated use, the efficiency of recovery of the catalyst becomes very low.

In the distillation process, all the cobalt carbonyl complex catalyst employed can be recovered. However, when the catalyst is used repeatedly, activity of the catalyst is lowered and high boiling substances derived from polymerization of butadiene accumulate in the catalyst. This is not desirable.

The above prior processes for recovering a cobalt carbonyl complex catalyst from the reaction mixture obtained by reacting butadiene, carbon monoxide and an alcohol in the presence of the cobalt carbonyl complex catalyst have the following shortcomings:

(1) When the catalyst is used repeatedly, it is difficult to maintain the activity of the catalyst at a high level; and (2) It is difficult to recover all the catalyst from the reaction mixture. Therefore, recovery of the cobalt carbonyl complex catalyst can not be effected on an industrial scale.

In oxo synthesis using a cobalt carbonyl catalyst, the cobalt component employed can be recovered in the form of organic or inorganic acid salts, hydroxide and basic carbonate from the reaction mixture obtained by the oxo synthesis. In this case either of two processes is used. In one process (hereinafter referred to as aqueous extraction process) the reaction mixture is contacted with an aqueous solution of an acid or a salt, thereby extracting the cobalt component from the oil phase with the aqueous phase. In other process (hereinunder referred to as the precipitation process) the cobalt from the reaction mixture is precipitated by thermal decomposition, contacting the cobalt carbonyl with an aqueous acid solution to recover cobalt, and then the cobalt is recovered by alkaline treatment.

However, the processes for recovering cobalt from the reaction mixture obtained in the oxo synthesis by aqueous extraction process are improper for hydroesterification of butadiene because tertiary amines, such as pyridine or isoquinoline are used in the hydroesterification of butadiene. That is, to avoid the reaction of the acid with the tertiary amine the aqueous extraction process can not be applied to the hydroesterification of butadiene.

In the precipitation process, cobalt carbonyl is precipitated by thermal decomposition, and then organic solvents are recovered from the mixture containing the cobalt carbonyl by distillation. The cobalt is recovered by contacting the resulting residue with an aqueous acid solution. In this case, however, since the residue contains tarry or solid high boiling point substances, the ratio of recovered cobalt becomes very low.

On the other hand, 20 times as much cobalt is used in the hydroesterification reaction of butadiene, as in the oxo synthesis. Therefore, it is important to increase the recovery ratio of recovered cobalt in the hydroesterification reaction of butadiene.

SUMMARY OF THE INVENTION

The present inventors carried out research for recovering cobalt in a high yield from the reaction mixture obtained in hydroesterification reaction of butadiene. We found that this can be achieved by distilling the reaction mixture to remove organic volatile components, such as the product, the unreacted raw material and the solvent, and contacting the residue with an aqueous acid solution in the presence of a solvent.

The present invention relates to a process for recovering cobalt component from the reaction mixture obtained by reacting butadiene, carbon monoxide and a alcohol in the presence of a solvent and a catalyst selected from cobalt carbonyl or cobalt carbonyl complex by distilling the reaction mixture to remove organic volatile components comprised of the unreacted raw materials, a 3-pentenoic ester as a product and the solvent, and contacting the residue with an organic solvent to dissolve and/or disperse the residue in the solvent and contacting the resulting organic solution with an aqueous acid solution to extract any cobalt component from the organic solution with the aqueous acid solution, and separating the aqueous acid solution containing the cobalt component from the organic solution, and neutralizing the aqueous acid solution with an alkaline solution to precipitate a cobalt component.

This invention relates to a process for producing a 3-pentenoic ester which comprises reacting butadiene, carbon monoxide and an alcohol in the presence of a solvent and a catalyst selected from cobalt carbonyl or cobalt carbonyl complex, characterized by distilling the reaction mixture to remove organic volatile components comprised of the 3-pentenoic ester and the unreacted raw materials and the solvent and contacting the distillation residue with an organic solvent to dissolve and/or disperse the residue in the solvent and contacting the resulting organic solution with an aqueous acid solution to extract any cobalt component from the organic solution with the aqueous acid solution, and separating the aqueous acid solution containing the cobalt component from the organic solution, and neutralizing the aqueous acid solution with an alkaline solution to precipitate a cobalt component.

DETAILED DESCRIPTION OF THE INVENTION

Alcohols employed in the practice of this invention include alcohols having 1–10 carbon atoms, such as methanol, ethanol, propanol and butanol. Methanol and ethanol are important industrially. Any one or a mixture of those alcohols may be used. The amount of the alcohol employed is not critical. Preferably, the alcohol is used in an amount of more than equivalent mole to butadiene, more preferably the alcohol in an amount of 1 to 5 mols per 1 mol of butadiene may be used.

The reaction of this invention is carried out in the presence of a tertiary amine solvent selected from isoquinoline, pyridine or their derivatives, In general, the amount of solvent employed is in the range of 0.1–5 mol, preferably 0.3–2 mol per 1 mol of butadiene.

The catalyst employed in the practice of the hydroesterification reaction of butadiene is cobalt carbonyl or cobalt carbonyl complex. Dicobalt octacarbonyl or a complex of cobalt carbonyl and a tertiary amine may be included in the catalyst.

The cobalt carbonyl catalyst may be the synthetic solution obtained by reacting synthetic gas (CO and $H_2$) with cobalt compound(s) selected from the group consisting of inorganic cobalt compounds, such as cobalt hydroxide, cobalt carbonate and basic cobalt carbonate or organic cobalt compounds, such as cobalt organic acid salts, cobaltocene and cobalt acetylacetonate in an alcohol employed as a starting material in the presence of a polymerization inhibitor and/or a tertiary amine. In this case, the synthetic solution reacts with butadiene and carbon monoxide to form a 3-pentenoic ester. The reaction of synthetic gas (CO and $H_2$) with the cobalt compounds, may be carried out by a conventional method. For example, dicobalt octacarbonyl reacts with the synthesis gas ($CO/H_2 = 3:1$ by mol) at 120° C. under 200 $Kg/cm^2$ G within 0.5 hours.

The amount of the catalyst employed is not critical. In general, the catalyst may be in the range of 0.01–0.2 mol per 1 mol of butadiene. When the catalyst is used in an amount of less than 0.01 mol per 1 mol of butadiene, the reaction rate becomes extremely low. When the catalyst is used in an amount of more than 0.2 mol per 1 mol of butadiene, it adds unnecessarily to the cost.

According to the present invention, methyl 3-pentenoate and ethyl 3-pentenoate can be produced by hydroesterification of butadiene, carbon monoxide and an alcohol. Other 3-pentenoic esters can also be produced.

The hydroesterification reaction temperature is not critical. The reaction temperature may be within the range of 80° C. to 200° C., preferably 100° to 140° C. The partial pressure of carbon monoxide is not critical, either, but may be more than 50 $Kg/cm^2$, preferably within the range of 100 to 400 $Kg/cm^2$.

The cobalt component is recovered from the reaction mixture obtained by reacting butadiene, carbon monoxide and an alcohol. First of all the reaction mixture may be distilled under atmospheric pressure to remove low boiling components, such as butadiene and the alcohol. Then the mixture is distilled under reduced pressure to remove all the 3-pentenoic esters and tertiary amines, such as pyridine and isoquinoline. Finally the mixture may be distilled at 220° C. under pressure of 10 mm Hg to dry the mixture, thereby obtaining a solid residue. The residue comprises high boiling substances formed as by-products in the hydroesterification reaction and cobalt component. The amount of the residue depends on the reaction conditions. The cobalt component is dispersed in tarry or solid high boiling point substance.

A solvent is added to the residue so obtained. Then the mixture may be maintained at room temperature or may be heated at a temperature below the boiling point of the solvent, thereby dissolving and/or dispersing the residue in the solvent. It is preferable that the procedure be effected while refluxing the solvent. The solvents employed in the practice of this procedure serve for dissolving and/or dispersing the residue and include, for example water-insoluble oxygen-containing solvents, such as diethyl ether, di-n-propyl ether, di-n-butyl ether, methylethyl ether, methyl propyl ether, methyl butyl ether, anisole, phenetole and the like; aliphatic hydrocarbons, such as petroleum ether, n-hexane, n-heptane, n-octane, isooctane, nonane, decane, dimethyl ethyl methane, tetramethyl methane, ethyl trimethyl methane, trimethyl isobutyl methane and the like; alicyclic hydrocarbons, such as cyclohexane, cyclooctane, decalin and the like and aromatic hydrocarbons, such as benzene, toluene, xylene, trimethyl benzene, ethyl benzene, methyl ethyl benzene, diethyl benzene, isopropyl benzene and the like.

The amount of the solvent employed depends on the kind of solvent. In general, the amount of solvent employed may be 1–50 times the amount of the residue, preferably 5–20 times as much as the residue by weight.

After the organic solvent is added to the residue, an aqueous acid solution is added to the organic solution, and the mixture is heated with stirring. During the procedure, the cobalt component is extracted from the organic solution with the aqueous acid solution.

The acid materials employed in the practice of this procedure may be organic acid or mineral acids. Mineral acids selected from $H_2SO_4$, HCl and $HNO_3$ are preferable from the point of view of economy.

The amount of the acids employed may be more than the amount required to react with all the cobalt present in the residue. Use of too much of the acids is not preferable from the point of view of economy.

Concentration of the aqueous acid solution employed is not critical. In general, when mineral acids are used, the concentration may be in the range of 1–12 normal in order to avoid the reaction of the acid with hydrocarbon.

The aqueous acid solution containing the cobalt component is separated from the organic solution by any known method.

Cobalt component is recovered from the aqueous phase by any known method. The aqueous acid solution containing the cobalt component is neutralized by an alkaline solution, such as a sodium hydroxide solution, a potassium hydroxide solution and a sodium carbonate solution to precipitate a cobalt component. The cobalt hydroxide or basic cobalt carbonate so precipitated is filtered, and vacuum-dried to recover the desired cobalt salt in a high yield.

On the other hand, the solvent can be recovered from the organic phase containing high boiling substances by a simple procedure. The solvent so recovered is recirculated to acid treatment step.

According to the present invention, the cobalt component can be recovered in a high yield from the reaction mixture obtained by reacting butadiene, carbon monoxide and an alcohol in the presence of a catalyst selected from cobalt carbonyl or cobalt carbonyl complex.

This invention is illustrated by but not limited to the following Examples.

EXAMPLES 1-5

Butadiene and methanol were reacted in the presence of dicobalt octacarbonyl (catalyst) and pyridine or isoquinoline (solvent) under pressure of 300 Kg/cm$^2$ by carbon monoxide at 120°-130° C. for 1-2 hours. Cobalt present in the reaction mixture obtained by the hydroesterification reaction was determined by quantitative analysis.

The reaction mixture was distilled at 50°-120° C. under atmospheric pressure to remove low boiling materials, such as butadiene and methanol. Then the mixture was distilled under reduced pressure to recover substantially all of the methyl 3-pentenoate, pyridine or isoquinoline employed as a solvent. Finally the mixture was distilled under pressure of 10 mm Hg at 220° C. until the solid material was obtained.

Solvent given in Table 1 was added to the residue. The mixture was stirred while refluxing the solvent to dissolve and/or disperse the residue in the solvent. Then a mineral acid aqueous solution as given in Table 1 was added to the organic solution and the mixture was heated with stirring. After the above procedure was completed, the mixture was cooled to room temperature. The aqueous phase was separated from the organic phase by a conventional method. The amount of cobalt present in the aqueous phase was determined by quantitative analysis to calculate cobalt recovery ratio in an acid treating step. An alkaline material was added dropwise to the aqueous phase; and neutralizing treatment was effected with stirring at room or elevated temperature. The cobalt salt crystal so precipitated was filtered and vacuum-dried. The amount of cobalt present in the cobalt salt and the mother liquid was determined by quantitative analysis to calculate cobalt recovery ratio in an alkaline treating step. Recovery ratio of cobalt present in the reaction mixture obtained by reacting butadiene, carbon monoxide and an alcohol was determined by multiplying the cobalt recovery ratio in the acid treating step by the cobalt recovery ratio in the alkaline treating step.

Kinds of solvent employed, reaction conditions and the results are shown in Table 1.

Control Tests 1-3

The reaction mixture was obtained by reacting butadiene, carbon monoxide, and an alcohol by repeating the same procedure of Examples 1-5. The residue was obtained from the reaction mixture in the same way as in Examples 1 to 5.

An aqueous acid solution as given in Table 2 was added to the residue. The mixture was heated with stirring to extract a cobalt salt from the residue with the aqueous acid solution. Then the mixture was cooled to room temperature. The solid components were filtered to obtain a filtrate.

The aqueous phase was separated from the filtrate containing high boiling substances. The amount of cobalt present in the aqueous phase was determined in the same way as in the alkaline treating step of Examples 1-5. The reaction conditions and the results are shown in Table 2.

TABLE 1

| | | | Ex. 1 | Ex. 2 | Ex. 3 | Ex. 4 | Ex. 5 |
|---|---|---|---|---|---|---|---|
| components | butadiene | g(mol) | 42(0.777) | same as the left | 42(0.777) | same as the left | same as the left |
| | methanol | g(mol) | 33(1.03) | same as the left | 33(1.03) | same as the left | same as the left |
| | isoquinoline | g(mol) | 60(0.465) | | 30(0.233) | | 60(0.233) |
| | pyridine | g(mol) | | 60(0.759) | 30(0.379) | 60(0.759) | |
| | Co$_2$(CO)$_8$ | g(mol) | 8(0.023) | 10(0.029) | 12(0.035) | 12(0.035) | 12(0.035) |
| reaction conditions | CO partial pressure | Kg/cm$^2$ | 300 | 300 | 300 | 300 | 300 |
| | reaction temperature | °C. | 123 | 123 | 123 | 123 | 130 |
| | reaction time | hr | 2 | 2 | 1 | 1.5 | 1.5 |
| acid treating step | residue (Co content) | g wt % | 8.6 29.5(0.0431) | 10.2 30.9(0.0535) | 9.2 40.8(0.0637) | 13.0 28.9(0.0638) | 10.4 35.1(0.0620) |
| | solvent | kind g | benzene 50 | diethyl ether 80 | cyclohexane 40 | petroleum ether 80 | toluene 50 |
| | acid | kind(conc.) mol | H$_2$SO$_4$(3N) 0.0474 | H$_2$SO$_4$(3N) 0.0589 | HNO$_3$(2N) 0.1338 | HCl (6N) 0.1404 | HCl(3N) 0.1364 |
| | ratio of solvent to residue by weight | | 5.81 | 7.84 | 4.35 | 6.15 | 4.81 |
| | molar ratio of the acid employed per cobalt in the residue | | 1.10 | 1.10 | 1.05 | 1.10 | 1.10 |
| | treating conditions | | heating and stirring | same as the left | heating and stirring | same as the left | same as the left |
| | Co recovery ratio % | | more than 99 | more than 99 | more than 99 | more than 99 | more than 99 |
| alkaline treating step | amount of alkali employed | kind(conc.) mol | Na$_2$CO$_3$(1N) 0.0496 | NaOH(2N) 0.1231 | Na$_2$CO$_3$(1N) 0.0669 | NaOH(2N) 0.1467 | Na$_2$CO$_3$(1N) 0.0713 |
| | molar ratio of the alkali employed per cobalt in the aqueous acid solution | | 1.15 | 1.15 | 1.05 | 1.15 | 1.15 |
| | treating conditions | | neutralization at room temp. | neutralization at elevated temp. | neutralization at elevated temp. | same as the left | same as the left |
| | Co recovery ratio % | | more than 99.9 | more than 99.9 | more than 99.9 | more than 99.9 | more than 99.9 |
| | overall Co recovery ratio % | | more than 99 | more than 99 | more than 99 | more than 99 | more than 99 |

TABLE 2

| | | | Control test 1 | Control test 2 | Control test 3 |
|---|---|---|---|---|---|
| Component | butadiene | g(mol) | 42(0.777) | same as the left | same as the left |
| | methanol | g(mol) | 33(1.03) | same as the left | same as the left |

TABLE 2-continued

|  |  | Control test 1 | Control test 2 | Control test 3 |
|---|---|---|---|---|
| | isoquinoline g(mol) | 60(0.465) | 30(0.233) | |
| | pyridine g(mol) | | 30(0.379) | 60(0.759) |
| | $Co_2(CO)_8$ g(mol) | 8(0.023) | 12(0.035) | 12(0.035) |
| reaction conditions | CO partial pressure $Kg/cm^2$ | 300 | 300 | 300 |
| | reaction temp. °C. | 123 | 123 | 123 |
| | reaction time hr | 2 | 1 | 1.5 |
| acid treating step | residue g | 8.9 | 9.5 | 11.0 |
| | (CO content) wt % (mol) | 29.2(0.0441) | 41.1(0.0663) | 30.8(0.0575) |
| | solvent kind | — | — | — |
| | g | — | — | — |
| | acid kind (conc.) | $H_2SO_4$(3N) | $HNO_3$(2N) | HCl(6N) |
| | mol | 0.0485 | 0.1392 | 0.1265 |
| | solvent/residue (by weight) | — | — | — |
| | molar ratio of the acid employed per cobalt in the residue | 1.10 | 1.05 | 1.10 |
| | treating conditions | heating and stirring | same as the left | same as the left |
| | Co recovery ratio % | 66.9 | 82.3 | 71.2 |
| alkaline treating step | alkali kind (conc.) | $Na_2CO_3$(1N) | $Na_2CO_3$(1N) | NaOH(2N) |
| | mol | 0.0507 | 0.0696 | 0.1323 |
| | molar ratio of the alkali employed per cobalt in the aqueous acid solution | 1.15 | 1.05 | 1.15 |
| | treating conditions | neutralization at room temp. | neutralization at elevated temp. | same as the left |
| | Co recovery ratio % | more than 99.9 | more than 99.9 | more than 99.9 |
| | Overall Co recovery ratio % | 66.8 corres. to Ex. 1 and 2 | 82.2 corres. to Ex. 3 | 71.1 corres. to Ex. 4 |

What is claimed is:

1. A process for recovering cobalt component from the reaction mixture obtained by reacting butadiene, carbon monoxide and an alcohol in the presence of a solvent and a catalyst selected from cobalt carbonyl or cobalt carbonyl complex which comprises distilling the reaction mixture to remove organic volatile components comprised of the unreacted raw materials, a 3-pentenoic ester and the solvent, and contacting the residue with an organic solvent selected from the group consisting of water-insoluble ethers, aliphatic hydrocarbons, alicyclic hydrocarbons and aromatic hydrocarbons to dissolve and/or disperse the residue in the solvent, and contacting the resulting organic solution with an aqueous acid solution to extract any cobalt component from the organic solution with the aqueous acid solution, and separating the aqueous acid solution containing the cobalt component from the organic solution, and neutralizing the aqueous acid solution with an alkaline solution to precipitate a cobalt component.

2. The process as defined in claim 1 wherein the distillation is effected in two stages; the first stage is effected under atmospheric pressure and the second stage is effected under reduced pressure.

3. The process as defined in claim 1 wherein the organic solvent for dissolving and/or dispersing the residue is selected from the group consisting of diethyl ether, di-n-propyl ether, di-n-butyl ether, methyl ethyl ether, methyl propyl ether, methyl butyl ether, anisole, phenetole, petroleum ether, n-hexane, n-heptane, n-octane, isooctane, nonane, decane, dimethyl ethyl methane, tetramethyl methane, ethyl trimethyl methane, trimethyl isobutyl methane, cyclohexane, cyclooctane, decalin, benzene, toluene, xylene, trimethyl benzene, ethyl benzene, methyl ethyl benzene, diethyl benzene, isopropyl benzene and mixture thereof.

4. The process as defined in claim 3 wherein the amount of organic solvent used is 1–50 times the amount of the residue.

5. The process as defined in claim 1 wherein the aqueous acid solution is selected from the group consisting of organic acids and mineral acid solution.

6. The process as defined in claim 5 wherein the aqueous acid solution is selected from the group consisting of aqueous solutions of $H_2SO_4$, HCl and $HNO_3$.

7. In a process for producing a 3-pentenoic ester which comprises reacting butadiene, carbon monoxide and an alcohol in the presence of a solvent and a catalyst selected from cobalt carbonyl or cobalt carbonyl complex, the improvement which comprises distilling the reaction mixture to remove organic volatile components comprises of the 3-pentenoic ester and the unreacted raw materials and the solvent, and contacting the distillation residue with an organic solvent to dissolve and/or disperse the residue in the solvent, and contacting the resulting organic solution with an aqueous acid solution to extract any cobalt component from the organic solution with the aqueous acid solution, and separating the aqueous acid solution containing the cobalt component from the organic solution, and neutralizing the aqueous acid solution with an alkaline solution to precipitate a cobalt component.

* * * * *